US011956040B2

(12) United States Patent
Meng et al.

(10) Patent No.: US 11,956,040 B2
(45) Date of Patent: Apr. 9, 2024

(54) BEAM SWEEPING ON REFERENCE SIGNAL TRANSMISSION FOR UL POSITIONING

(71) Applicant: Nokia Technologies Oy, Espoo (FI)

(72) Inventors: Yan Meng, Shanghai (CN); Tao Tao, Shanghai (CN); Ryan Keating, Chicago, IL (US); Jianguo Liu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 52 days.

(21) Appl. No.: 17/795,940

(22) PCT Filed: Feb. 13, 2020

(86) PCT No.: PCT/CN2020/075131
§ 371 (c)(1),
(2) Date: Jul. 28, 2022

(87) PCT Pub. No.: WO2021/159407
PCT Pub. Date: Aug. 19, 2021

(65) Prior Publication Data
US 2023/0094748 A1 Mar. 30, 2023

(51) Int. Cl.
*H04B 7/06* (2006.01)
*H04L 5/00* (2006.01)

(52) U.S. Cl.
CPC ......... *H04B 7/0617* (2013.01); *H04B 7/0695* (2013.01); *H04L 5/0025* (2013.01); *H04L 5/0048* (2013.01); *H04L 5/0094* (2013.01)

(58) Field of Classification Search
CPC ... H04B 7/0617; H04B 7/0695; H04L 5/0025; H04L 5/0048; H04L 5/0094; G01S 5/06;
(Continued)

(56) References Cited

U.S. PATENT DOCUMENTS

2014/0187171 A1* 7/2014 Xiao ................ H04B 7/0469
455/67.11
2014/0329542 A1 11/2014 Hooli et al.
(Continued)

FOREIGN PATENT DOCUMENTS

CN 110401982 A 11/2019
WO 2019/032887 A1 2/2019
WO 2019/195528 A1 10/2019

OTHER PUBLICATIONS

Extended European Search Report received for corresponding European Patent Application No. 20918815.0, dated Nov. 25, 2022, 9 pages.
(Continued)

*Primary Examiner* — David S Huang
(74) *Attorney, Agent, or Firm* — Nokia Technologies Oy

(57) ABSTRACT

A method for a base station includes sending a request for a report on beamforming capability to a target user equipment; receiving the report on the beamforming capability from the target user equipment; allocating at least one positioning reference signal resource for use by the target user equipment based on at least the capability information included in the report; determining a beam sweeping mle based on the at least one positioning reference signal resource allocated for the target user equipment; and sending the positioning reference signal resource allocation and the beam sweeping mle to the target user equipment. A corresponding method for a user equipment includes receiving a request for a report on beamforming capability from a serving base station; sending the report on the beamforming capability to the serving base station; receiving information relating to at least one positioning reference signal resource and a beam sweeping rule from the serving base station; and performing beam sweeping on uplink positioning reference signal trans-
(Continued)

missions using the received positioning reference signal resource allocation based on the beam sweeping rule.

17 Claims, 9 Drawing Sheets

(58) Field of Classification Search
CPC . G01S 2205/008; H04W 64/00; H04W 16/28; H04W 8/24
See application file for complete search history.

(56) References Cited

U.S. PATENT DOCUMENTS

| | | |
|---|---|---|
| 2017/0373740 A1 | 12/2017 | Guo et al. |
| 2017/0374637 A1 | 12/2017 | Akkarakaran et al. |
| 2018/0139763 A1 | 5/2018 | Bitra et al. |
| 2019/0081751 A1 | 3/2019 | Miao et al. |
| 2019/0335430 A1 | 10/2019 | Ljung |
| 2019/0394634 A1 | 12/2019 | Akkarakaran et al. |
| 2020/0028544 A1* | 1/2020 | Bengtsson ............. H04B 7/088 |

OTHER PUBLICATIONS

Office action received for corresponding Indian Patent Application No. 202247051764, dated Dec. 8, 2022, 6 pages.

Office action received for corresponding Vietnamese Patent Application No. 1-2022-05685, dated Oct. 7, 2022, 2 pages of office action and 1 page of translation available.

"New WID: NR Positioning Support", 3GPP TSG RAN Meeting #83, RP-190752, Agenda: 9.1.1, Intel Corporation, Mar. 18-21, 2019, 6 pages.

"Transmission Measurement Function in NG-RAN", 3GPP TSG-RAN WG3 #106, R3-196508, Ericsson, Nov. 18-22, 2019, 15 pages.

"3rd Generation Partnership Project; Technical Specification Group Radio Access Network; NR; Physical layer procedures for data (Release 16)", 3GPP TS 38.214, V16.0.0, Dec. 2019, pp. 1-148.

"Draft Agenda", 3GPP TSG RAN WG1 Meeting #85, R1-163960, Chairman, May 23-27, 2016, 8 pages.

Rastorgueva-Foi et al., "User Positioning in MMW 5G Networks Using Beam-RSRP Measurements and Kalman Filtering", arXiv, Mar. 26, 2018, 7 pages.

"3rd Generation Partnership Project; Technical Specification Group Radio Access Network; NR; User Equipment (UE) feature list (Release 15)", 3GPP TR 38.822, V15.0.1, Jul. 2019, pp. 1-64.

International Search Report and Written Opinion received for corresponding Patent Cooperation Treaty Application No. PCT/CN2020/075131, dated Nov. 17, 2020, 9 pages.

"UL beam management", 3GPP TSG RAN WG1#89, R1-1707952, Agenda: 7.1.2.2.1, Samsung, May 15-19, 2017, 6 pages.

"UL beam management for NR MIMO", 3GPP TSG RAN WG1 NR Ad-Hoc#2, R1-1710184, Agenda: 5.1.2.2.1, ZTE, Jun. 27-30, 2017, 8 pages.

Office action received for corresponding Japanese Patent Application No. 2022-548948, dated Jan. 9, 2024, 4 pages of office action and 6 pages of summary available.

"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.

"Optimized beam correspondence assessment using localized beam sweeping", 3GPP TSG-RAN WG4 Meeting #91, R4-1905646, Agenda item: 6.5.9.8.1, Fraunhofer HHI, May 13-17, 2019, pp. 1-5.

* cited by examiner

BEAM SWEEPING ON REFERENCE SIGNAL TRANSMISSION FOR UL POSITIONING

RELATED APPLICATION

This application was originally filed as PCT Application No. PCT/CN2020/075131 on Feb. 13, 2020, each of which is incorporated herein by reference in its entirety.

TECHNICAL FIELD

This disclosure relates to a beam sweeping mechanism for the uplink positioning of a user equipment. More specifically, the present disclosure relates to a beam sweeping mechanism by which a user equipment may inform a network whether it supports beam sweeping and how many beams are required to scan in all directions, so that a target gNB can allocate sufficient UL resources to the user equipment for beam sweeping.

BACKGROUND

Work has been done in 3GPP for native positioning support in New Radio (NR). In that work, the following positioning solutions have been specified for NR Rel-16:
 Downlink Time Difference of Arrival (DL-TDOA);
 Uplink Time Difference of Arrival (UL-TDOA);
 Downlink Angle of Departure (DL-AOD);
 Uplink Angle of Arrival (UL-AOA); and
 Multi-cell Round Trip Time (Multi-RTT).

Uplink Time Difference of Arrival (UL-TDOA) has been specified as one of the positioning methods for NR Rel-16. UL-TDOA uses time difference measurements based on uplink reference signals taken by several gNBs/TRPs (Transmission and Reception Points) to determine an exact location for a user equipment (UE). In LTE positioning, there was a logical unit called the location measurement unit (LMU) which could be co-located or non-located with a base station. In NR, this terminology has shifted somewhat, and it is instead called the transmission measurement function (TMF). As some TMF are UL positioning-only reception points (RPs), TMF can be only used for measuring UL positioning signals and making positioning measurements, such as RTOA and UL-AOA.

NR SRS has been used as a starting point for the design and analysis of UL-based positioning solutions. Beamforming at the UE side for UL transmission is used to improve hearability in NR, especially, for high frequency bands. The present specification will focus on beamformed UL transmission to support UL reception at UL positioning-only reception points (RP) in NR positioning. The sounding reference signal (SRS) is one example of an UL reference signal that could be transmitted for NR positioning; another example could be Physical Random Access Channel (PRACH) transmissions.

NR supports the transmission and the reception of multiple beams for all NR-operation frequency bands. The NR Rel-15 beam management mechanism was established mainly for a case with one single cell. A SRS signal transmitted from a UE in an SRS resource may be in an omni-direction or in a beamformed direction. For supporting most UL-based NR positioning techniques, it is required that multiple cells receive the SRS from the UE.

One option to support an ability of multiple cells to receive SRS signals from a UE is based on the principle of reciprocity. In this case, a UE will first measure DL reference signals, such as synchronization signal blacks (SSBs), of multiple cells, and then transmit the SRS in the corresponding UL beam directions based on received DL beams.

In detail, a UE may need to use a directional spatial domain transmission filter to beamform the SRS or UL channel toward an intended destination. To facilitate a correct NR SRS transmit beamforming in FR2 (Frequency Range 2), a reference signal for SRS spatial domain transmission filter is introduced in NR. In particular, the higher layer parameter spatialRelationInfo is used in the configuration of each SRS resource that contains the ID of a reference SSB, the ID of a reference CSI-RS, or the ID of a reference SRS along with the ID of its corresponding UL BWP. The UE transmits the target SRS resource with the same spatial domain transmission filter used for the reception of the reference SSB, CSI-RS or PRS when configured with a spatialRelationInfo.

However, in some scenarios, the SRS spatial information is not always available. For example, for UL positioning-only reception points (RPs), that can be only for measuring UL positioning signals and they do not transmit RS of their own. In this case, the UE cannot be configured with spatial relations for those RPs.

One straightforward method is to use beam sweeping when correct spatial relation cannot be provided. But, in an NR Rel-16 system, it is up to UE implementation for SRS beamforming. However, this method cannot guarantee that a UE will do the correct beamforming and will transmit toward a UL positioning-only RP. Yet, there are still some issues for the beam sweeping method:
 The UE may not support the beamforming. Thus, if the UE uses the omni-direction antenna for SRS transmission at FR2, the SRS could not be received by some neighbor cells. The hearability and positioning accuracy will therefore be impacted.
 UE may not do beam sweeping or 360° sweeping without the indication of the gNB. For example, the UE may perform beam sweeping only on the one-half circle side, opposite to the direction of the UL positioning-only RPs. In this case, these UL positioning-only RPs would not be able to receive the UL SRS from the UE.
 The gNB does not know the number of Tx beams that the UE required for sweeping one round. So, the gNB would not know how many SRS resources should be configured for the UE. For example, if the gNB configures three SRS resources to the UE for beam sweeping, but the UE requires five beams to sweep one round, then the UE can only scan part of the beam direction for SRS transmission. Then, some UL positioning-only RPs could not receive the SRS signals from the UE.
 If beam sweeping is entirely left up to UE implementation, then gNBs/UL positioning only-RPs will have no knowledge of how the UE performs the sweep and how many resources the UE uses for the sweep. For example, if eight SRS resources are configured for sweeping, but the UE only uses six to sweep, then the behavior for the remaining two resources is ambiguous. This could lead to interference or measurement issues.

In the present specification, a more efficient SRS transmission mechanism to resolve the above issues is proposed.

SUMMARY

In a first aspect of the present disclosure, a method comprises: sending a request for a report on beamforming capability to a target user equipment; receiving the report on the beamforming capability from the target user equipment; allocating at least one positioning reference signal resource for use by the target user equipment based on at least the capability information included in the report; determining a beam sweeping rule based on the at least one positioning reference signal resource allocated for the target user equipment; and sending the positioning reference signal resource allocation and the beam sweeping rule to the target user equipment.

In a second aspect of the present disclosure, an apparatus comprises: at least one processor; and at least one memory including computer program code, the at least one memory and the computer program code being configured, with the at least one processor, to cause the apparatus to perform the following: send a request for a report on beamforming capability to a target user equipment; receive the report on the beamforming capability from the target user equipment; allocate at least one positioning reference signal resource for use by the target user equipment based on at least the capability information included in the report; determine a beam sweeping rule based on the at least one positioning reference signal resource allocated for the target user equipment; and send the positioning reference signal resource allocation and the beam sweeping rule to the target user equipment.

In a third aspect of the present disclosure, an apparatus comprises: means for sending a request for a report on beamforming capability to a target user equipment; means for receiving the report on the beamforming capability from the target user equipment; means for allocating at least one positioning reference signal resource for use by the target user equipment based on at least the capability information included in the report; means for determining a beam sweeping rule based on the at least one positioning reference signal resource allocated for the target user equipment; and means for sending the positioning reference signal resource allocation and the beam sweeping rule to the target user equipment.

In a fourth aspect of the present disclosure, a computer program product comprises a non-transitory computer-readable storage medium bearing computer program code embodied therein for use with a computer, the computer program code comprising code for performing: sending a request for a report on beamforming capability to a target user equipment; receiving the report on the beamforming capability from the target user equipment; allocating at least one positioning reference signal resource for use by the target user equipment based on at least the capability information included in the report; determining a beam sweeping rule based on the at least one positioning reference signal resource allocated for the target user equipment; and sending the positioning reference signal resource allocation and the beam sweeping rule to the target user equipment.

In a fifth aspect of the present disclosure, a method comprises: receiving a request for a report on beamforming capability from a serving base station; sending the report on the beamforming capability to the serving base station; receiving information relating to at least one positioning reference signal resource and a beam sweeping rule from the serving base station; and performing beam sweeping on uplink positioning reference signal transmissions using the received positioning reference signal resource allocation based on the beam sweeping rule.

In a sixth aspect of the present disclosure, an apparatus comprises: at least one processor; and at least one memory including computer program code, the at least one memory and the computer program code being configured, with the at least one processor, to cause the apparatus to perform the following: receive a request for a report on beamforming capability from a serving base station; send the report on the beamforming capability to the serving base station; receive information relating to at least one positioning reference signal resource and a beam sweeping rule from the serving base station; and perform beam sweeping on uplink positioning reference signal transmissions using the received positioning reference signal resource allocation based on the beam sweeping rule.

In a seventh aspect of the present disclosure, an apparatus comprises: means for receiving a request for a report on beamforming capability from a serving base station; means for sending the report on the beamforming capability to the serving base station; means for receiving information relating to at least one positioning reference signal resource and a beam sweeping rule from the serving base station; and means for performing beam sweeping on uplink positioning reference signal transmissions using the received positioning reference signal resource allocation based on the beam sweeping rule.

In an eighth aspect of the present disclosure, a computer program product comprises a non-transitory computer-readable storage medium bearing computer program code embodied therein for use with a computer, the computer program code comprising code for performing: receiving a request for a report on beamforming capability from a serving base station; sending the report on the beamforming capability to the serving base station; receiving information relating to at least one positioning reference signal resource and a beam sweeping rule from the serving base station; and performing beam sweeping on uplink positioning reference signal transmissions using the received positioning reference signal resource allocation based on the beam sweeping rule.

BRIEF DESCRIPTION OF THE DRAWINGS

The foregoing and other aspects of these teachings are made more evident in the following detailed description, when read in conjunction with the attached drawing figures.

DETAILED DESCRIPTION

Figure 1:
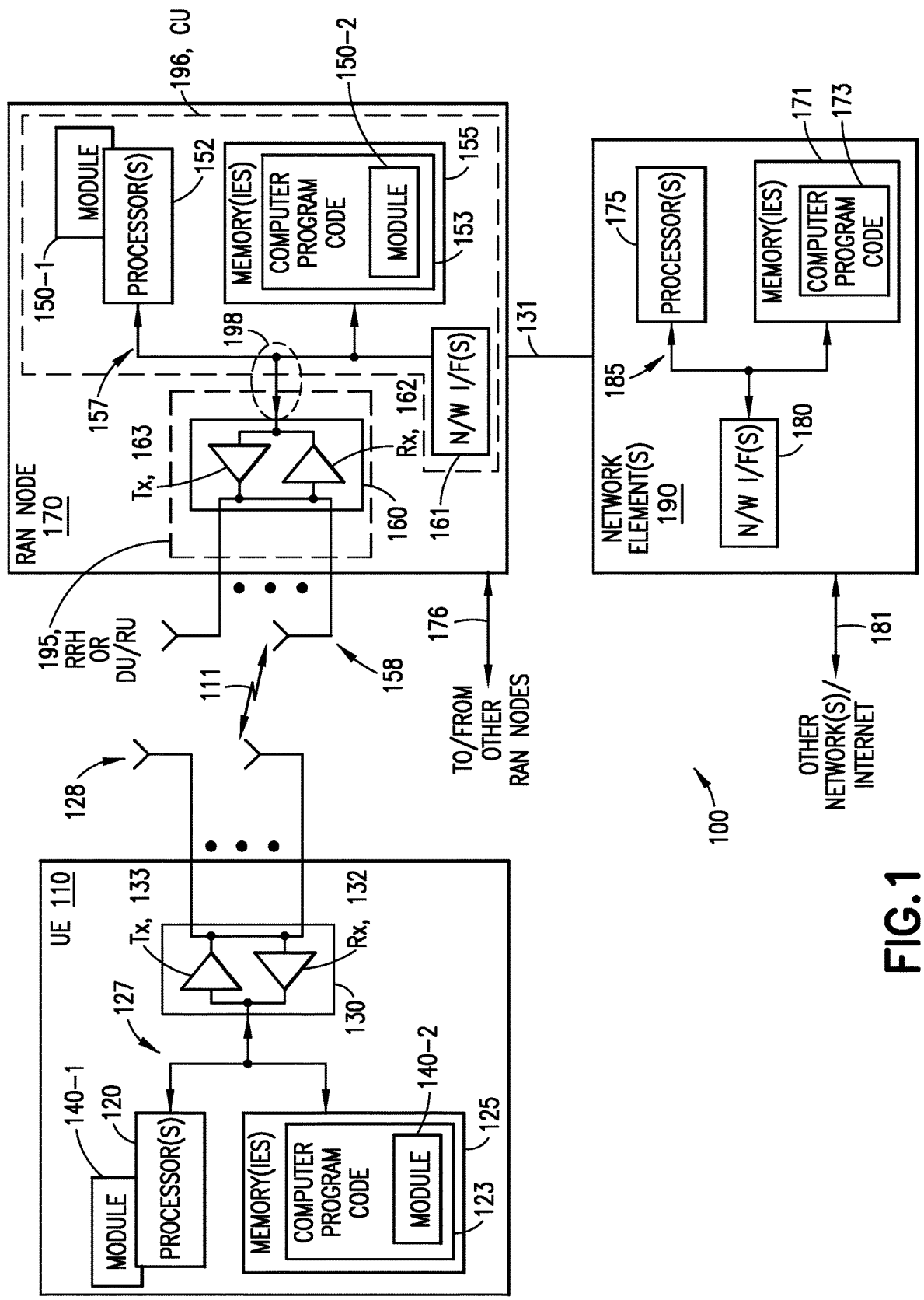
FIG. 1 shows a simplified block diagram of certain apparatus in which the subject matter of the present disclosure may be practiced.

FIG. 1 is a block diagram of one possible and non-limiting example in which the subject matter of the present disclosure may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device, such as a mobile device, that can access the wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with RAN node 170 via a wireless link 111.

The RAN node 170 in this example is a base station that provides access by wireless devices, such as the UE 110, to the wireless network 100. The RAN node 170 may be, for example, a base station for 5G, also called New Radio (NR). In 5G, the RAN node 170 may be an NG-RAN node, which is defined as either a gNB or an ng-eNB. A gNB is a node providing NR user plane and control-plane protocol terminations toward the UE, and connected via the NG interface to a SGC, such as, for example, the network element(s) 190. The ng-eNB is a node providing E-UTRA user plane and control plane protocol terminations towards the UE, and connected via the NG interface to the SGC.

The NG-RAN node may include multiple gNBs, which may also include a centralized unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or ng-eNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, module 150 may be implemented as module 150-2, which is implemented as computer program code 153 executed by the one or more processors 152. For instance, the one or more memories 155 and the computer program code 153 are configured, with the one or more processors 152, to cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a centralized unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360° area so that the single base station's coverage area covers an approximate oval or circle. Furthermore, each cell can correspond to a single carrier and a base station may use multiple carriers. So if there are three 120° cells per carrier and two carriers, then the base station has a total of six cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured, with the one or more processors 175, to cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer-readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer-readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
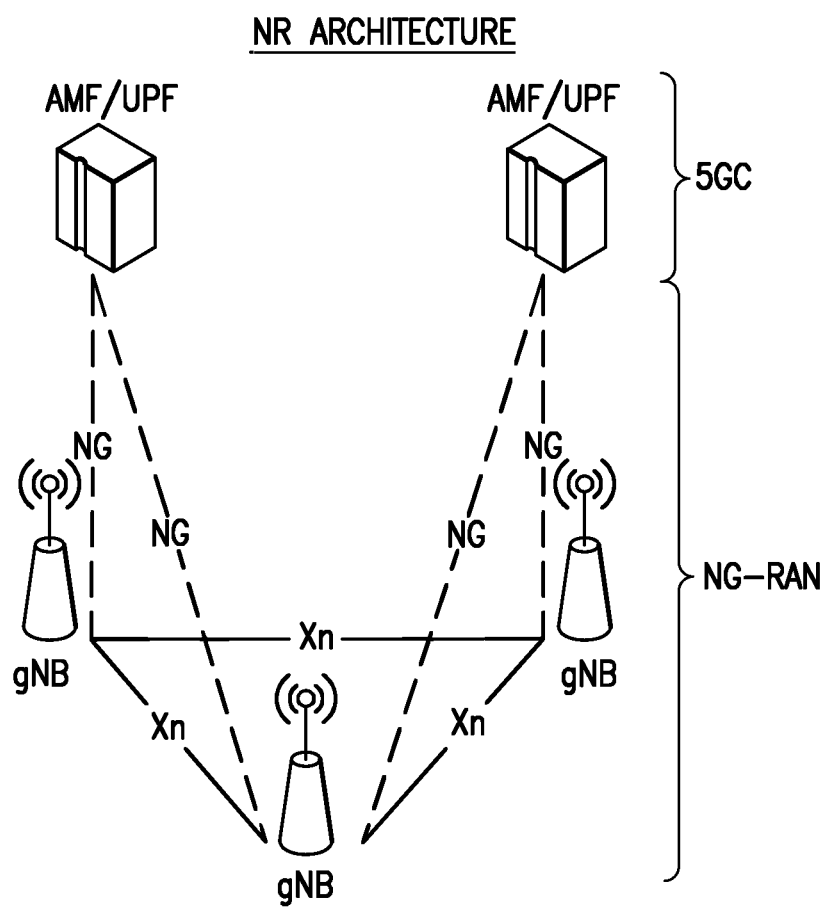
FIGS. 2 and 3 show an example of New Radio (NR) architecture having the 5G core (5GC) and the NG-RAN.
Figure 3:
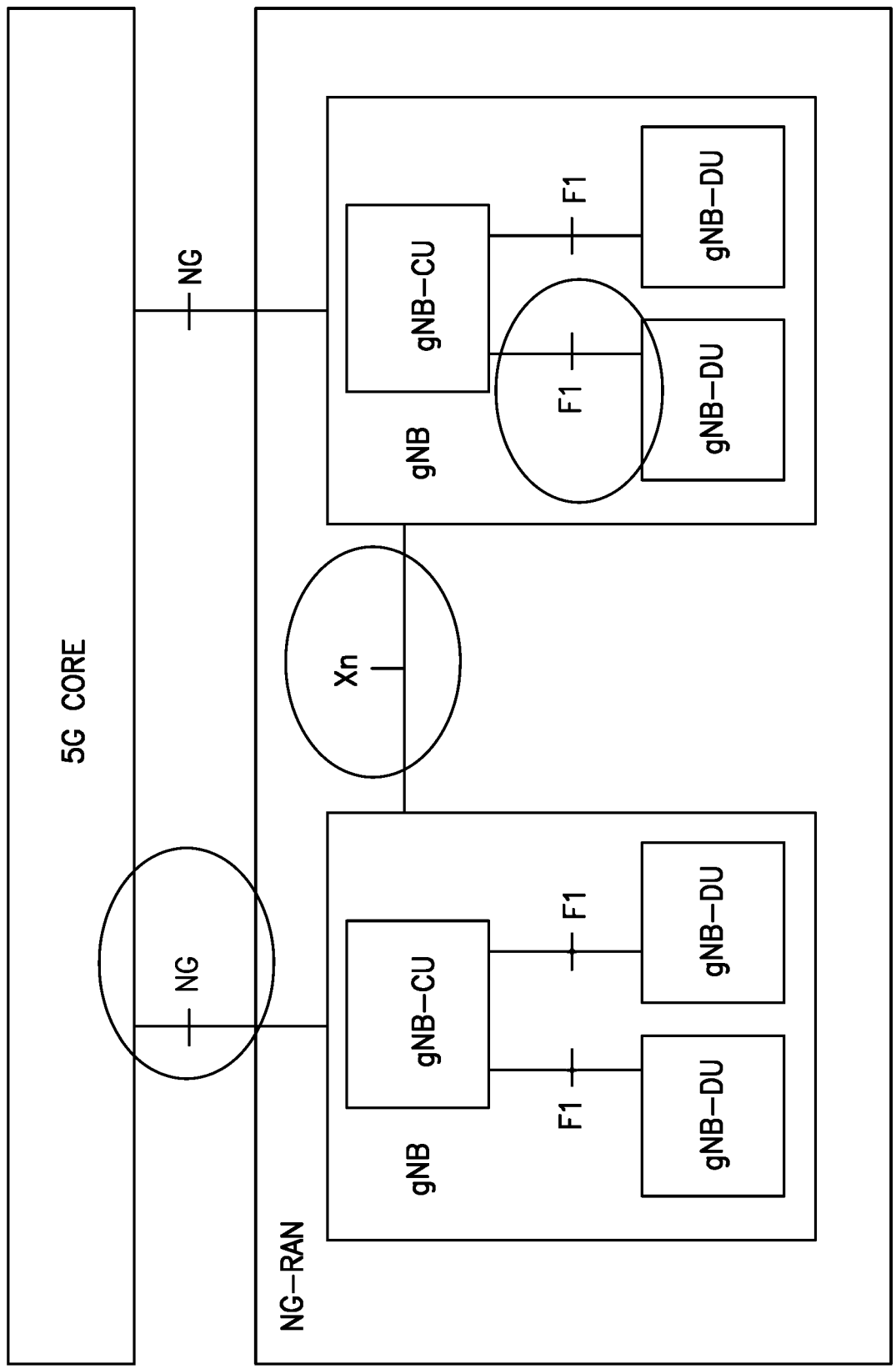

FIGS. 2 and 3 show an example of New Radio (NR) architecture having the 5G core (5GC) and the NG-RAN. The base stations gNB are coupled to the 5GC by the interface to core NGs, and the gNBs are coupled to each other by the inter-base station interface Xn.

In UL-TDOA (Uplink Time Difference of Arrival), which is a type of user equipment positioning, multiple cells, gNBs and transmission and reception points, must "hear" sounding reference signals from a user equipment and use the sounding reference signals to determine the location of the user equipment. For better hearability, reciprocity can be used. With reciprocity, cells transmit positioning reference signals to the user equipment, and the user equipment then transmits sounding reference signals in corresponding uplink directions back to the cells.

Some cells or reception points may be uplink-positioning-only and thus unable to transmit positioning reference signals to the user equipment. The user equipment is then unable to send sounding reference signals back to those cells via reciprocity to enable positioning. One way to ensure such cells receive sounding reference signals from the user equipment is by beam sweeping sounding reference signals at the user equipment. But, user equipments may vary per implementation and have different beam sweeping capabilities. Without knowing individual user equipment beam sweeping capabilities, a cell is unable to reliably receive beam swept sounding reference signals from the user equipment.

Accordingly, there is a need for an uplink positioning scheme that will work more reliably across different types of user equipments and different types of cells.

The present disclosure presents a method of collecting the beam sweeping capabilities of a user equipment, generating a beam sweeping rule based on the beam sweeping capabilities of the user equipment, and causing the user equipment to operate according to the beam sweeping rule.

In the discussion to follow, frequent reference is made to the use of sounding reference signals (SRSs), which are an example of positioning reference signals (PRS). It should be understood that other types of positioning reference signals may be used in the practice of the methods disclosed herein. A feature of the present disclosure relates to the provision of one Tx beam sweeping mechanism based on the network indication to facilitate the SRS reception in UL positioning only RPs. Correspondingly, the UE may inform the network whether it supports Tx beam sweeping and how many beams are required to scan all of the directions, that is, 360°, if beam sweeping is supported. With such information, the gNB can allocate sufficient SRS resources to the UE for beam sweeping. Meanwhile, the gNB would indicate to the UE how to do the beam sweeping for SRS transmission in the configured SRS resource.

The proposed mechanism includes the following:

Capability collection:
    The gNB would collect beamforming capability from target UE which should include at least the following information:
        Whether UE supports Tx beam sweeping;
        The number of Tx beams required for a full sweep—by "full sweep" or "comprehensive" is meant beamformed transmission such that the set of beams in the sweep covers the 360° plane in the spatial domain;
        The number of SRS resource required for a full sweep;
        The information of supported beam-width, that is, maximum and minimum beam width; and
        Optionally, information on the SRS beam transmission direction.

Beam sweeping rule determination based on the collected capability information:

The gNB would make a beam sweeping rule to make sure UE can scan the correct direction, including three sweeping modes:
Mode 1: use the omnidirectional antenna at FR1 or if UE does not support beam sweeping;
Mode 2: use of 360° beam sweeping at FR2;
Option 1: dedicated beam sweeping SRS resources; and
Option 2: joint beam sweeping SRS resources with the spatial-relation SRS; and
Mode 3: sweep on partial beam directions.

Beam sweeping rule indication:
The gNB indicates the beam sweeping rule to the target UE, for example, by RRC signaling; and
UE indicates, for example, by RRC signaling, whether it completes the beam sweeping.

The proposed mechanism will now be described in greater detail with various embodiments.

Without knowledge of the beam sweeping rule and of the specific SRS configuration, the UE would not be able to perform beam sweeping in the right way.

To determine the SRS resource and beam sweeping rule, the gNB would request the UE to report the UE capability. Based on the reported UE capability, the gNB would allocate the SRS resource for beam sweeping and also provide the sweeping mode to tell the UE how to do the beam sweeping.

Exemplary Embodiments of UE Capability Collection:

In LTE, the UE capability information is an RRC message that UE sends to the network. The network first sends a UECapabilityEnquiry message to the UE, and UE replies with UECapabilityInformation, as shown in Table 1, which gives one example of UE capability information Enquiry, below. At present, we can reuse the same procedure in the LTE system. However, in the present proposed mechanism, we should introduce the extra UE capability information into the UECapabilityInformation and UECapabilityEnquiry messages, as shown in Table 2.

TABLE 1

| Direction | Message | Comments |
| --- | --- | --- |
| UE ← NW | UECapabilityEnquiry | Network requests UE to send capability information |
| UE → NW | UECapabilityInformation | UE reports the information to NW as requested |

TABLE 2

| Element | Definition |
| --- | --- |
| Beam sweeping capability | Specify whether there is support for beam sweeping. |
| The number of Tx beams | Specify the maximum and minimum number of Tx beams required to scan all the directions. Based on this, the gNB can determine the SRS resource for sweeping. |
| The number of SRS resources | Specify the maximum and minimum number of SRS resources required to scan all the directions. |
| The information of the SRS transmission direction | Specify the Rx beams information that the UE is used to receiving the RS in spatialRelationInfo. Based on this, the gNB can support the resource sharing with spatial-relation SRS. |
| The information of supported beam width | Specify the maximum and minimum beam width that the UE supported. Based on this, the gNB can determine the number of SRS resources for beam sweeping (that is, 360° or some desired directions). |

A baseline beam sweeping capability parameter set could be used. For example, if a given UE supports the UL AOA method at FR2, it may have a baseline set of Tx beam sweeping capabilities. This could further minimize the overhead of capability signaling and simplify the implementation.

Exemplary Embodiments of SRS Resource Allocation:

Based on the reported beamforming capability information, the serving gNB would configure the SRS resource for a target UE.

One SRS resource would be configured to UE for omnidirectional antenna at FR1 or if UE cannot support beam sweeping even at FR2.

Here, we consider two options for resource configurations if the UE supports beam sweeping at FR2:

Option 1: Dedicated SRS resource for beam sweeping:

The SRS resources for beam sweeping can be separated from SRS resources that have been configured with the spatial relation. The SRS resources for beam sweeping will not consider the resources of spatial-relation SRS.

In this case, the SRS resources have been allocated according to the number of Tx beams/the number of SRS resources reported by the UE to finish 360° sweeping at the UE side.

Figure 4:
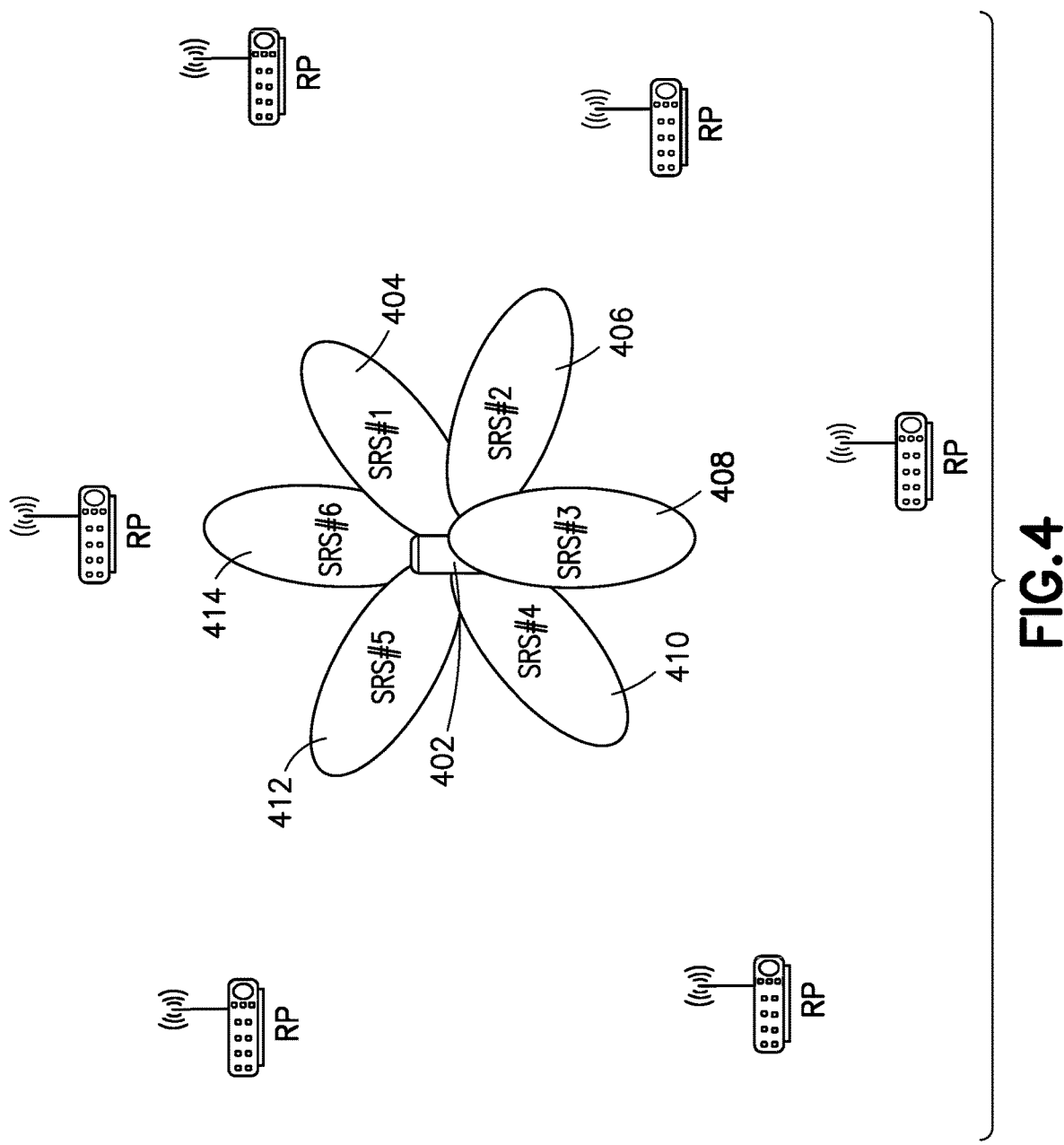
FIG. 4 illustrates an example of dedicated beam sweeping.

For example, if the UE requires six Tx beams to scan all of the directions, the gNB would allocate six SRS resources for the UE. As shown in FIG. 4, which illustrates an example of dedicated beam sweeping, UE 402 transmits SRS in six different beam directions, SRS#1 to SRS#6, in six SRS resource configured by the serving gNB.

Option 2: Resource sharing with spatial-relation SRS transmission:

In some scenarios, the UL-positioning RPs are located near neighbor gNBs;

thus, the normal SRS towards the neighbor gNBs can be received by the RPs. Here, we can combine such beam sweeping with normal spatial-relation SRS transmission. Thus, the SRS resource for beam sweeping would be shared with the spatial-relation SRS resource. The serving gNB will configure both the reference DL RS for spatial relations and the beam-sweeping resource in the same SRS resource set.

Firstly, the serving gNB needs to know some additional information to configure the correct number of SRS resource for a full beam sweeping.

In one embodiment, the UE could report the Rx beams that the UE is using to receive the RS in spatialRelationInfo. Before SRS resource configuration, the UE could report the Rx beam ID of its corresponding RSRP/RSRQ values, measured on each configured DL RS resource, and/or the Rx beam ID of a preferred DL RS resource, such as one having the highest RSRP/RSRQ. Based on this information, the serving gNB can know how many SRS resources are required to complete a sweep. For example, if the UE has spatialRelationInfo configured for gNBs A and B, it may actually use the same Rx beam for both. In that case, it would need five resources to complete a sweep even though two of six gNBs have spatialRelationInfo configured.

In another embodiment, the UE could report receiver beam information (e.g., the receiver beam identification and/or the number of beams required for sweeping the remaining beams that are not covered by the spatial-relation SRS). This information could be used during the updating phase for SRS resource reconfiguration. For example, at the start phase, the serving gNB would allocate six resources for UE to complete a full sweeping. Then, if the UE finds that the three beam directions have been covered by the spatial-relation SRS transmission, only three SRS resources would be required for sweeping the remaining beams. Then, the UE sends the request information along with the number of SRS resources only for sweeping the remaining beams to the serving gNB for SRS configuration updating.

Then, the SRS resource for beam sweeping can be configured according to the number of remaining beam directions that are not covered by the SRS resource configured with a spatial-relation RS. Or, the SRS resource for beam sweeping can be configured based on the Rx beams that the UE is using to receiving the RS in spatialRelationInfo.

Figure 5:
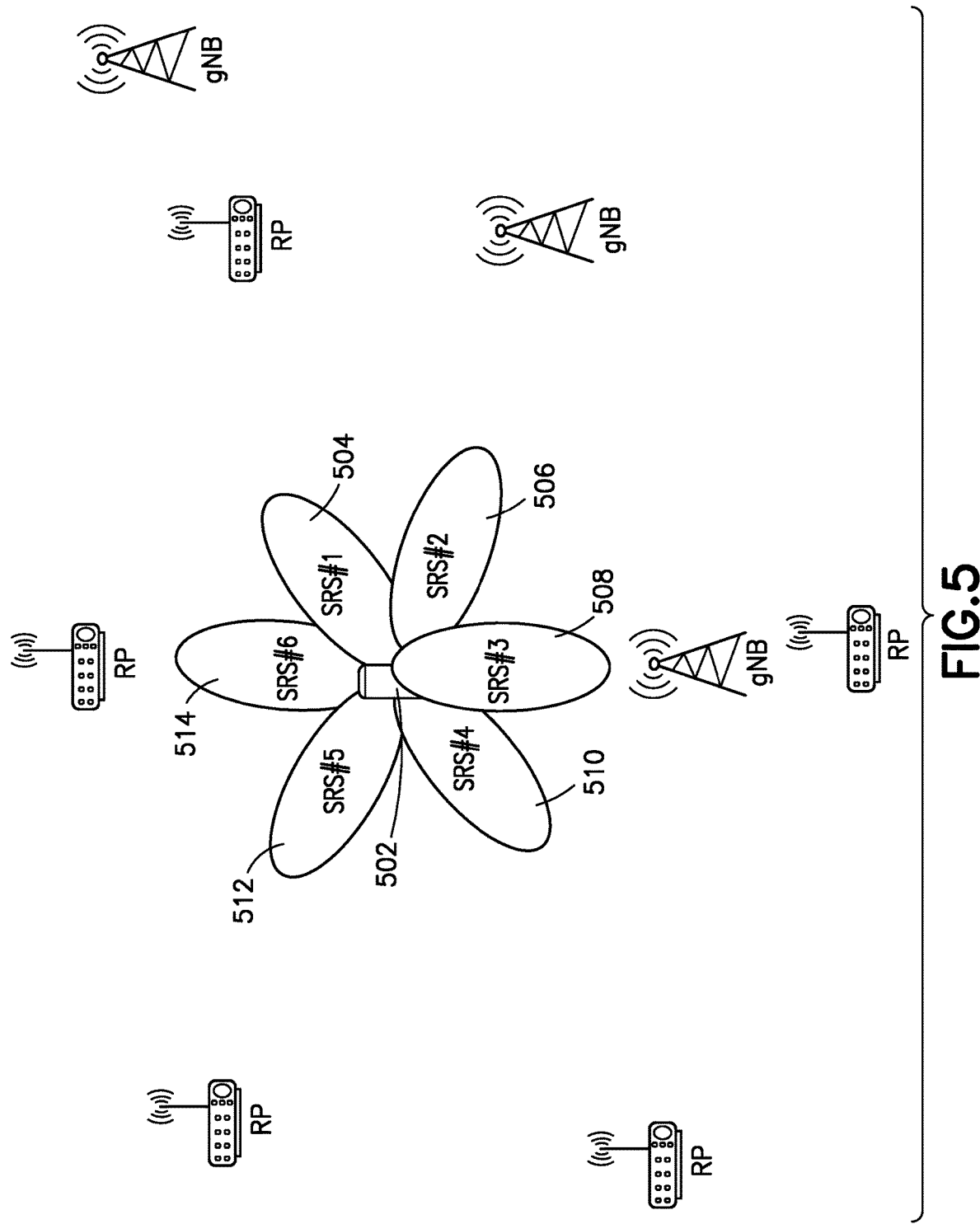
FIG. 5 illustrates an example of joint beam sweeping with spatial-relation SRS transmission.

For example, if the UE requires six Tx beams to scan all of the directions, and the gNB has configured three Tx beam directions with spatial-relation SRS, then the gNB would only configure the remain three SRS resources for beam sweeping. As shown in FIG. 5, which illustrates an example of joint beam sweeping with spatial-relation SRS transmission, the SRS#1 504, SRS#2 506, and SRS#3 508 have configured the spatial-relation SRS with normal SRS transmission towards neighbor gNBs. Therefore, the serving gNB only needs to configure the remaining three SRS resources, SRS#4 510, SRS#5 512, and SRS#6 514, for beam sweeping.

Exemplary Embodiments of the Beam Sweeping Rule Design:

The gNB would indicate to the UE how to do the beam sweeping based on the allocated SRS resource. For example, when UE receives six SRS resources, the UE should know whether the six SRS resource can be used only for beam sweeping, or the beam sweeping should share the six resource with the spatial-relation SRS transmission.

Here, the following beam sweeping modes are described:
Mode 1: Omnidirectional antenna transmission
In the current system, at FR1, the UE could use the omnidirectional or directional antenna, up to UE implementation. In the present disclosure, the omnidirectional antenna in FR1 should be mandatory for multiple cell reception. And, if the UE cannot support beam sweeping, the omnidirectional antenna should also be used.

Mode 2: Use of 360° sweeping
In FR2, beam sweeping should be mandatory if UE supports beam sweeping. Based on the different resource allocation methods, a different sweeping manner should be used at the UE side.

Option 1: dedicated beam sweeping
In this option, the UE should sweep all of the beam directions. For example, as shown in FIG. 4, UE 402 transmits SRS to six different beam directions, SRS#1 404, SRS#2 406, SRS#3 408, SRS#4 410, SRS#5 412, and SRS#6 414, to cover all of the directions.

Option 2: joint beam sweeping with spatial-relation SRS transmission
In this option, the UE should only sweep the remaining beam directions by excluding the beam directions that have been configured with the spatial relation. As shown in FIG. 5, the UE 502 only needs to do the beam sweeping on three different directions, SRS #4 510, SRS#5 512, and SRS#6 514. And the UE 502 transmits spatial-relation SRS in the other three directions, SRS#1 504, SRS#2 506, and SRS#3 508.

Figure 6:
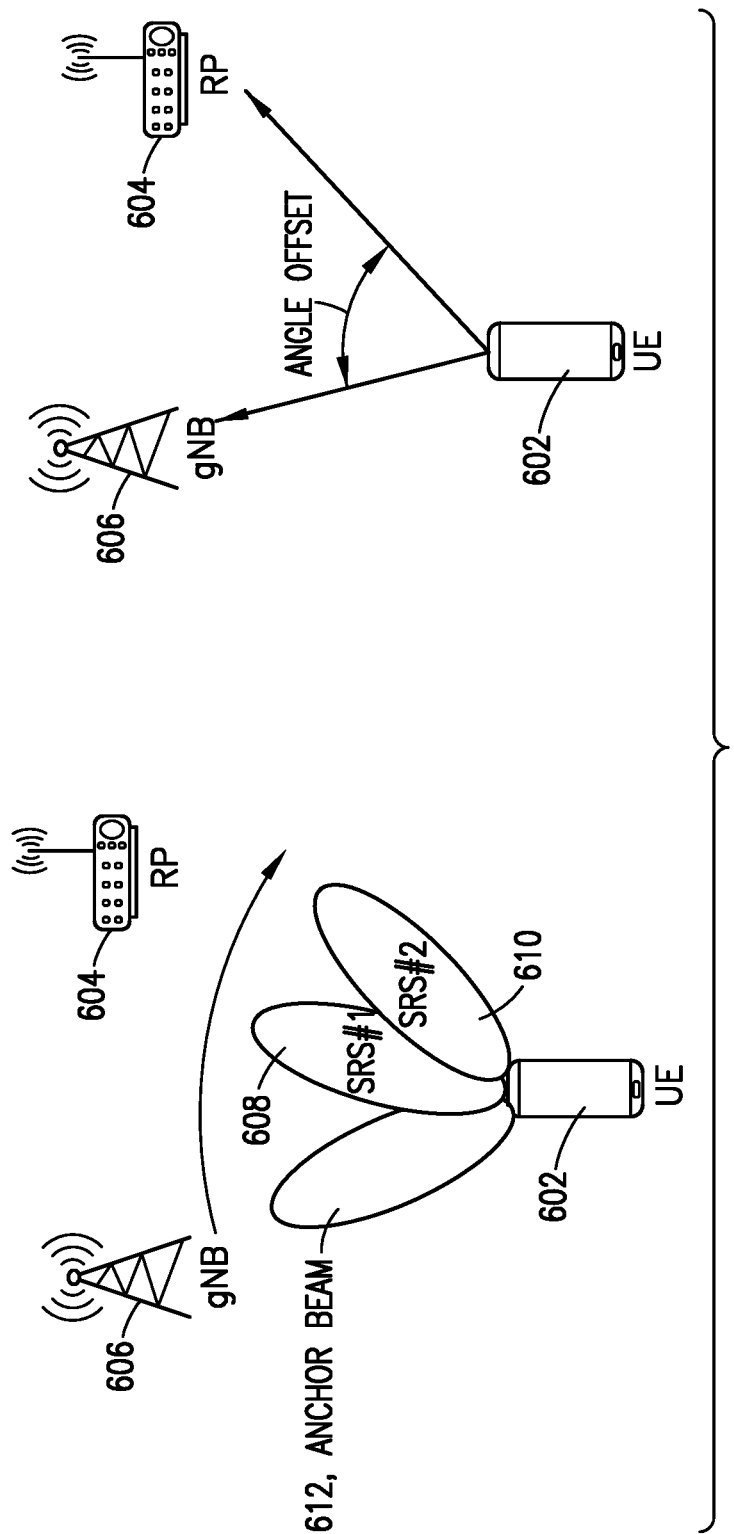
FIG. 6 illustrates an example of beam sweeping for Rx beam training at a reception point.

Mode 3: Sweeping only in some desired directions for some specific purposes
In some scenarios, the SRS can be swept in the rough direction of other gNBs which the serving gNB also thinks are in the direction of the UL positioning-only RP. For example, for some purposes, such as Rx beam training at a reception point RP, the gNB may request the UE to perform Tx beam sweeping. FIG. 6 shows an example of this scenario, where the RP 604 is located at one side of an anchor gNB 606 with one angle offset.

In FIG. 6, the UE 602 only needs to sweep one angle offset with one anchor node 606, where the anchor node can be one of the neighbor gNBs or the serving gNB. In this case, the serving gNB also needs to tell UE 602 how to sweep around the anchor node 606, for example, the sweeping direction, such as clockwise or counterclockwise, or left or right, and so forth. Here, the UE 602 could adjust the beam width based on the indication of the serving gNB or adjust itself based on the UE capability, such as maximum beam width and minimum beam width, the angle offset and the allocated SRS resource. As shown in FIG. 6, the UE 602 transmits SRS in two directions, SRS#1 608 and SRS#2 610 on the right side of the anchor beam 612 to facilitate the Rx beam training at reception point RP 604.

Exemplary Embodiments of the Beam Sweeping Rule Indication:

Here, how to indicate the beam sweeping mode will be described. This includes two parts: mode indication and some additional parameters for each mode.

(1) Mode indication:
In one embodiment, two bits (b1, b2) to indicate the sweeping modes are introduced as follows:
b1b2=00 indicates Mode 1 (Omni-direction antenna transmission);
b1b2=01 indicates Mode 2 (Option 1 of 360° beam sweeping);
b1b2=10 indicates Mode 2 (Option 2 of 360° beam sweeping); and
b1b2=11 indicates Mode 3 (sweeping the partial beam directions).

In another embodiment, the new terms "Omni-direction transmission", "360° beam sweeping", and "partial beam sweeping" can be introduced. When the term "360° beam sweeping" is enabled, one new bit signaling would be introduced to indicate which option of 360° beam sweeping is used for this sweeping mode.

(2) Additional parameters for Mode 2:
For Mode 2, additional parameters should be indicated to UE in addition to the beam sweeping mode. There are two alternatives for the indication as follows:
Implicit indication:
The gNB can implicitly indicate to the UE to do the beam sweeping based on the configured SRS resource. For example, if the gNB configures six SRS resources for dedicated beam sweeping, as in Option 1, it means that the UE should use the six Tx beams to finish 360° scanning.
explicit indication
The gNB also can indicate some additional parameters to facilitate UE beam sweeping. For example, the parameters should include at least the beam-width, radiation angle, or the relative angle offset between two beams, etc. Table 3 shows the additional parameters for Mode 2.

TABLE 3

| Element | Definition |
|---|---|
| beam-width | Specify the beam-width of the beams |
| radiation angle | Specify the radiation angle of the beams |
| angle offset | Specify the relative angle offset between two beams |

Both indication methods have advantages and disadvantages. They can be separately used or jointly used. The implicit indication method has low signaling overhead. However, the explicit indication method is more flexible, and can flexibly adjust the beam sweeping pattern.

(3) Additional parameters for Mode 3:

For sweeping Mode 3, additional parameters should also be indicated to UE in addition to the beam sweeping mode. For example, the parameters should include the SSB index of the anchor node, angle offset from the anchor node, the sweeping direction, such as right or left, or clockwise or counterclockwise, the number of Tx beams in the right direction from the anchor node, and the number of Tx beams in the left direction from the anchor node. Table 4 shows the additional parameters for Mode 3.

In addition, the signaling of beam sweeping mode (b1b2) and the additional parameters in Table 4 for sweeping Mode 3 can be sent from the gNB to the UE by radio resource control (RRC) message.

Based on the indication, the UE can know how to do the beam sweeping when it has received the SRS resource configuration from the serving gNB.

TABLE 4

| Element | Definition |
|---|---|
| anchor node | Specify the SSB index/cell ID of the anchor node |
| angle offset | Specify the angle offset from the anchor node |
| sweeping direction | Specify the following sweeping direction<br>1. sweeping two sides of the anchor node<br>  a. in the clockwise direction<br>  b. counter-clockwise direction<br>2. sweeping in the right side of the anchor node<br>3. sweeping in the left side of the anchor node |

Figure 7:
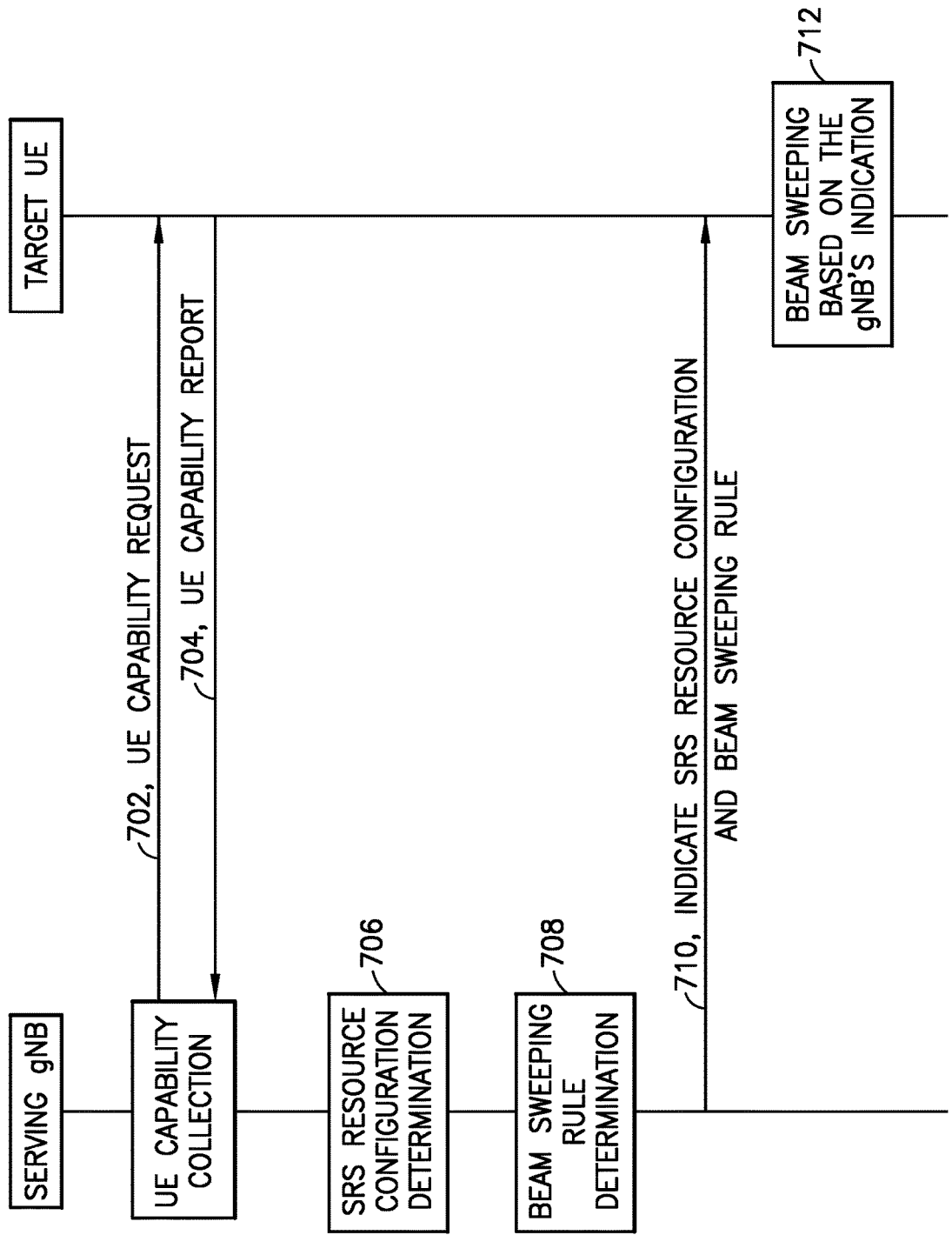
FIG. 7 depicts a detailed procedure and signaling diagram for the present mechanism.

Exemplary Embodiments of Positioning Procedure:

FIG. 7 shows the detailed procedure of the present mechanism including the following steps and the signaling flow:

Step 1: The serving gNB would first require target UE to report 702 the beamforming capability information by RRC signaling as in Table 1.

Step 2: The UE reports 704 some or all of capability information as in Table 2 to the serving gNB using the RRC signaling of Table 1. For example, the UE supports up to six Tx beams. So, the UE reports the number of Tx beams as value six (6) to the serving gNB.

Step 3: Based on the reported beamforming capability information from Step 2, the gNB would configure 706 the SRS resource for target UE. The detailed SRS resource configuration can be seen above in the "Exemplary embodiments of SRS resource allocation." For example, the serving gNB may allocate six (6) SRS resources for dedicated beam sweeping.

Step 4: Based on the allocated SRS resource from step 3, the gNB would make 708 a beam sweeping rule to make sure UE can do the correct sweeping based on the allocated SRS resource. The detailed beam sweeping rule can be seen above in the "Exemplary embodiments of the beam sweeping rule design." For example, the serving gNB may select Option 1 of the sweeping Mode 2 for the UE.

Step 5: The serving gNB shall also provide 710 the SRS resource and beam sweeping rule to the UE by RRC signaling. The detailed indication signaling can be seen above in the "Exemplary embodiments of the beam rule indication." For example, the serving gNB would send the bit b1b2=01 to the UE by RRC signaling if the gNB selects Option 1 of Mode 2.

Step 6: Based on the beam sweeping rule, the target UE would perform 712 Tx beam-sweeping on UL SRS transmissions in the allocated SRS resource. For example, based on the signaling b1b2=01 indicated from serving gNB, the UE can know it should finish 360° scanning by using six SRS resources as shown in FIG. 4.

Advantages:

The present mechanism can guarantee that a UE can do the correct SRS beam sweeping and transmit the SRS to UL positioning-only RPs. This could be critical to ensure that the RPs measure the SRS signal. Without the present mechanism, the network may be unable to correctly configure the SRS transmission for beam forming. In turn, the present mechanism improves the overall positioning accuracy and minimizes the resource overhead.

Figure 8:
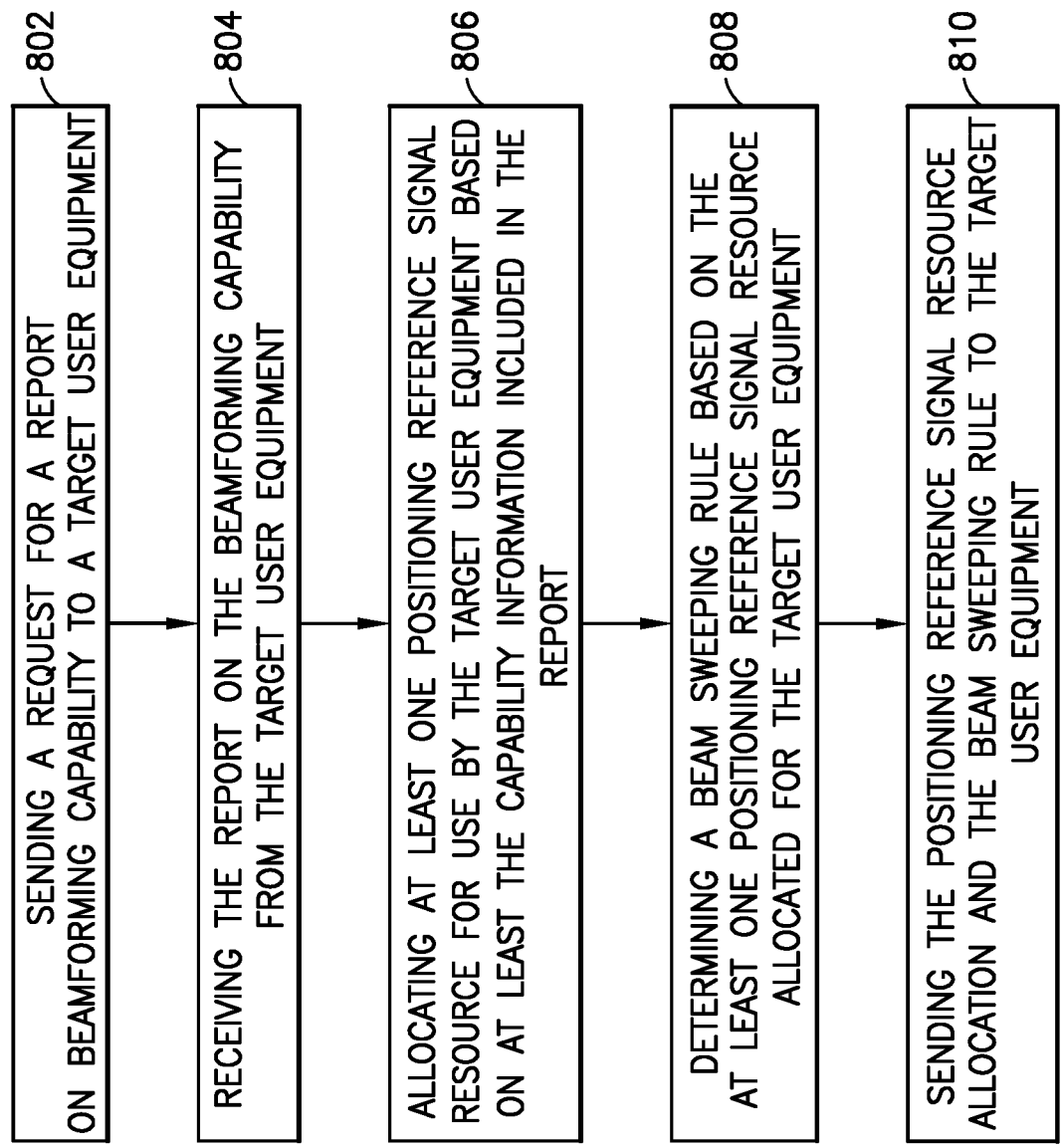
FIG. 8 is a flow chart illustrating a method performed by a serving base station in accordance with the present disclosure.

FIG. 8 is a flow chart illustrating a method performed by a serving base station in accordance with the present disclosure. In block 802, the base station sends a request for a report on beamforming capability to a target user equipment. In block 804, the base station receives the report on the beamforming capability from the target user equipment. In block 806, the base station allocates at least one positioning reference signal resource for use by the target user equipment based on at least the capability information included in the report. In block 808, the base station determines a beam sweeping rule based on the at least one positioning reference signal resource allocated for the target user equipment. And, in block 810, the base station sends the positioning reference signal resource allocation and the beam sweeping rule to the target user equipment.

Figure 9:
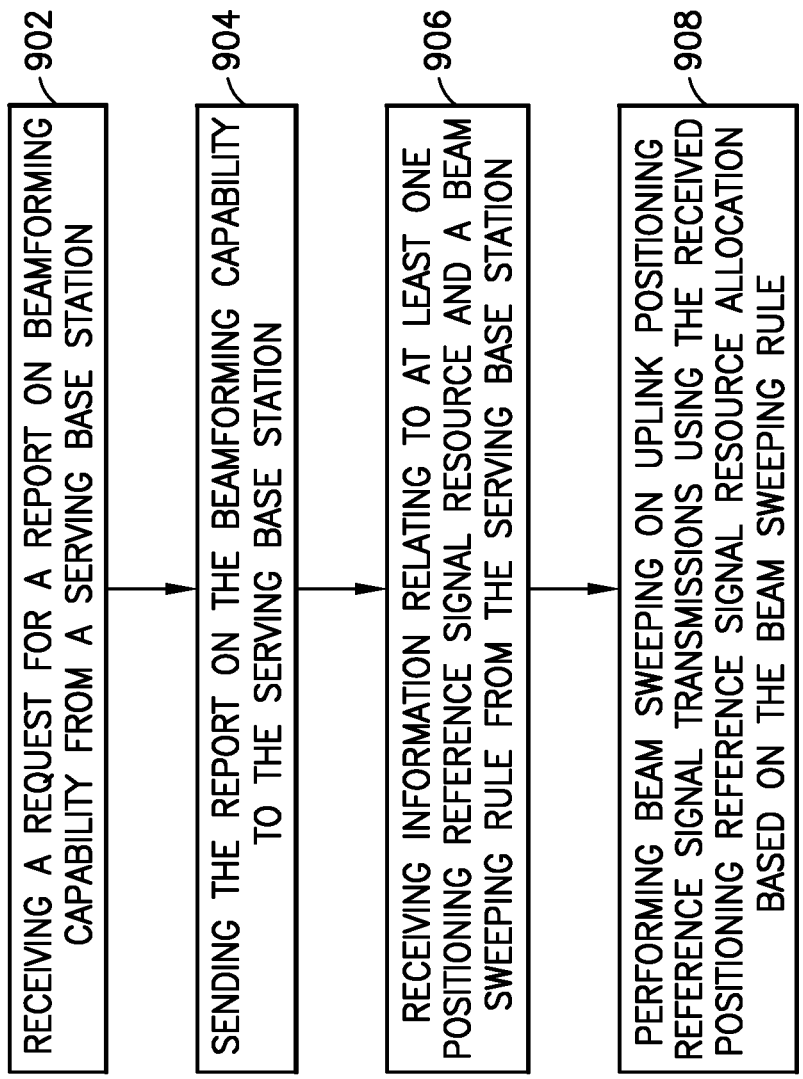
FIG. 9 is a flow chart illustrating a method performed by a target user equipment in accordance with the present disclosure.

FIG. 9 is a flow chart illustrating a method performed by a target user equipment in accordance with the present disclosure. In block 902, the user equipment receives a request for a report on beamforming capability from a serving base station. In block 904, the user equipment sends the report on the beamforming capability to the serving base station. In block 906, the user equipment receives information relating to at least one positioning reference signal resource and a beam sweeping rule from the serving base station. And, in block 908, the user equipment performs beam sweeping on uplink positioning reference signal transmissions using the received positioning reference signal resource allocation based on the beam sweeping rule.

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the exemplary embodiments are not limited thereto.

While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the disclosure may be practiced in various components, such as integrated circuit chips and modules, and that the exemplary embodiments of this disclosure may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this disclosure.

Various modifications and adaptations to the foregoing exemplary embodiments of this disclosure may become apparent to those skilled in the relevant arts in view of the foregoing description, when read in conjunction with the accompanying drawings. For example, while the exemplary embodiments have been described above in the context of advancements to the 5G NR system, it should be appreciated that the exemplary embodiments of this disclosure are not limited for use with only this one particular type of wireless communication system. The exemplary embodiments of the disclosure presented herein are explanatory and not exhaustive or otherwise limiting of the scope of the exemplary embodiments.

The following abbreviations may have been used in the preceding discussion:
AOA Angle of Arrival
AOD Angle of Departure
BWP Bandwidth Part
CSI Channel State Information
CU Centralized Unit
DL Downlink
DU Distributed Unit
eNB eNodeB (4G Base Station)
FR Frequency Range
FR1 Frequency Range 1
FR2 Frequency Range 2
GHz Gigahertz
gNB gNodeB (5G Base Station)
gNB-CU gNB Centralized Unit
gNB-DU gNB Distributed Unit
ID Identifier
LMF Location Management Function
LMU Location Measurement Unit
LPP LTE Positioning Protocol
LTE Long Term Evolution
NR New Radio (5G)
PRS Positioning Reference Signal
RF Radio Frequency
RP Reception Point
RRC Radio Resource Control
RS Reference Signal
RSRP Reference Signal Received Power
RSRQ Reference Signal Received Quality
RSTD Reference Signal Time Difference
RTOA Received Time of Arrival
RTT Round Trip Time
Rx Receiver
SI Study Item
SIB System Information Block
SRS Sounding Reference Signal
SSB Synchronization Signal Block
TDOA Time Difference of Arrival
TMF Transmission Measurement Function
TOA Time of Arrival
TRP Transmission and Reception Point
Tx Transmitter
UE User Equipment
UL Uplink
UL-TDOA Uplink Time Difference of Arrival
WI Work Item
3GPP 3$^{rd}$ Generation Partnership Project
5G 5$^{th}$ Generation
5GC 5G Core The terminology used herein is for the purpose of describing particular embodiments only and is not intended to be limiting of the disclosed embodiments. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present exemplary embodiments has been presented for purposes of illustration and description, but is not intended to be exhaustive or limited to the embodiments in the form disclosed. Many modifications and variations will be apparent to those of ordinary skill in the art without departing from the scope and spirit of the present disclosure. The embodiments were chosen and described in order to best explain the principles of the disclosure and the practical application, and to enable others of ordinary skill in the art to understand the disclosure for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments thereof.

Although described in the context of particular embodiments, it will be apparent to those skilled in the art that a number of modifications and various changes to these teachings may occur. Thus, while the examples have been particularly shown and described with respect to one or more disclosed embodiments, it will be understood by those skilled in the art that certain modifications or changes may be made therein without departing from the scope of the disclosure as set forth above, or from the scope of the claims to follow.

What is claimed is:

1. A method comprising:
    sending a request for a report on beamforming capability to a target user equipment;
    receiving the report on the beamforming capability from the target user equipment;
    allocating at least one positioning reference signal resource for use by the target user equipment based on at least the capability information included in the report, wherein the allocation of the at least one positioning reference signal resource includes one or more positioning reference signal resources for beam sweeping and one or more positioning reference signal resources with configured spatial relations, the one or more positioning reference signal resources for beam sweeping being allocated according to a number of beam directions not covered by the one or more positioning reference signal resources with configured spatial relations;

determining a beam sweeping rule based on the at least one positioning reference signal resource allocated for the target user equipment; and sending the positioning reference signal resource allocation and the beam sweeping rule to the target user equipment.

2. The method as claimed in claim 1, wherein the report on beamforming capability includes one or more of:
whether the user equipment supports beam sweeping;
a number of beams required for a full sweep;
a number of positioning reference signal resources required for a full sweep; and
information on a maximum and minimum supported beam width.

3. The method as claimed in claim 1, wherein the allocation of the at least one positioning reference signal resource includes one or more dedicated positioning reference signal resources for beam sweeping.

4. The method as claimed in claim 1, wherein the beam sweeping rule causes the target user equipment to scan according to one of three modes:
Mode 1, wherein omni-directional antenna transmission is used when the target user equipment does not support beam sweeping;
Mode 2, wherein comprehensive beam sweeping is used when the target user equipment supports beam sweeping; and
Mode 3, wherein partial beam sweeping is used when the target user equipment supports beam sweeping.

5. A method comprising:
receiving a request for a report on beamforming capability from a serving base station;
sending the report on the beamforming capability to the serving base station;
receiving information relating to at least one positioning reference signal resource and a beam sweeping rule from the serving base station, wherein the at least one positioning reference signal resource includes one or more positioning reference signal resources for beam sweeping and one or more positioning reference signal resources with configured spatial relations, the one or more positioning reference signal resources for beam sweeping being configured according to a number of beam directions not covered by the one or more positioning reference signal resources with configured spatial relations; and
performing beam sweeping on uplink positioning reference signal transmissions using the received positioning reference signal resource allocation based on the beam sweeping rule.

6. The method as claimed in claim 5, wherein the report on beamforming capability includes one or more of:
whether beam sweeping is supported;
a number of beams required for a full sweep;
a number of positioning reference signal resources required for a full sweep; and
information on a maximum and minimum supported beam width.

7. The method as claimed in claim 5, wherein the at least one positioning reference signal resource includes one or more dedicated positioning reference signal resources for beam sweeping.

8. The method as claimed in claim 5, wherein the beam sweeping rule enables scanning according to one of three modes:
Mode 1, wherein omni-directional antenna transmission is used when beam sweeping is not supported;
Mode 2, wherein comprehensive beam sweeping is used when beam sweeping is supported; and
Mode 3, wherein partial beam sweeping is used when beam sweeping is supported.

9. The method as claimed in claim 5, wherein the at least one positioning reference signal resource is a sounding reference signal resource for positioning.

10. An apparatus comprising:
at least one processor; and
at least one memory including computer program code, the at least one memory and the computer program code being configured, with the at least one processor, to cause the apparatus to perform the following:
receive a request for a report on beamforming capability from a serving base station;
send the report on the beamforming capability to the serving base station;
receive information relating to at least one positioning reference signal resource and a beam sweeping rule from the serving base station, wherein the at least one positioning reference signal resource includes one or more positioning reference signal resources for beam sweeping and one or more positioning reference signal resources with configured spatial relations, the one or more positioning reference signal resources for beam sweeping being configured according to a number of beam directions not covered by the one or more positioning reference signal resources with configured spatial relation; and
perform beam sweeping on uplink positioning reference signal transmissions using the received positioning reference signal resource allocation based on the beam sweeping rule.

11. The apparatus as claimed in claim 10, wherein the report on beamforming capability includes one or more of:
whether beam sweeping is supported;
a number of beams required for a full sweep;
a number of positioning reference signal resources required for a full sweep; and
information on a maximum and minimum supported beam width.

12. The apparatus as claimed in claim 10, wherein the at least one positioning reference signal resource includes one or more dedicated positioning reference signal resources for beam sweeping.

13. The apparatus as claimed in claim 10, wherein the beam sweeping rule enables scanning according to one of three modes:
Mode 1, wherein omni-directional antenna transmission is used when beam sweeping is not supported;
Mode 2, wherein comprehensive beam sweeping is used when beam sweeping is supported; and
Mode 3, wherein partial beam sweeping is used when beam sweeping is supported.

14. The apparatus as claimed in claim 13, wherein, when the beam sweeping rule enables scanning according to Mode 2, comprehensive beam sweeping is performed using one of:
all beam directions; and
joint beam sweeping with positioning reference signals with configured spatial relations.

15. The apparatus as claimed in claim 13, wherein, when the beam sweeping rule causes scanning according to Mode 2, beam directions corresponding to positioning reference signals with configured spatial relations are excluded.

16. The apparatus as claimed in claim 13, wherein, when the beam sweeping rule causes scanning according to Mode 3, sweeping is in only some desired directions.

17. The apparatus as claimed in claim 10, wherein the at least one positioning reference signal resource is a sounding reference signal resource for positioning.

\* \* \* \* \*